(12) United States Patent
Lardie

(10) Patent No.: US 11,547,109 B2
(45) Date of Patent: Jan. 10, 2023

(54) WEED ENCLOSURE DEVICE

(71) Applicant: Roland L. Lardie, Stanwood, MI (US)

(72) Inventor: Roland L. Lardie, Stanwood, MI (US)

( * ) Notice: Subject to any disclaimer, the term of this patent is extended or adjusted under 35 U.S.C. 154(b) by 186 days.

(21) Appl. No.: 16/523,208

(22) Filed: Jul. 26, 2019

(65) Prior Publication Data

US 2020/0029549 A1  Jan. 30, 2020

Related U.S. Application Data

(60) Provisional application No. 62/703,461, filed on Jul. 26, 2018.

(51) Int. Cl.
*A01M 21/04* (2006.01)

(52) U.S. Cl.
CPC .................. *A01M 21/043* (2013.01)

(58) Field of Classification Search
CPC ........ A01G 9/0291; A01G 9/00; A01G 9/124; A01G 9/026; A01G 9/028; A01G 13/02381; A01G 13/0243; A01G 13/10; A01G 13/0281; A01M 5/00; A01M 5/02
USPC .......... 220/4.22, 916, 4.24, 529, 229; 47/45, 47/66.3, 73, 29.2
See application file for complete search history.

(56) References Cited

U.S. PATENT DOCUMENTS

| | | | | |
|---|---|---|---|---|
| 411,739 A * | 9/1889 | Thayer | ................. | A01G 9/0295 47/73 |
| 420,736 A * | 2/1890 | Lucius | ..................... | B65D 7/22 220/62.18 |
| 645,518 A * | 3/1900 | Watt | .................... | A01G 13/0243 47/30 |
| 1,013,775 A * | 1/1912 | Hoffman | .................... | B65F 1/12 232/1 R |
| 1,321,747 A * | 11/1919 | Irlend | .................... | A01G 13/04 47/31.1 |
| 1,485,924 A * | 3/1924 | Hobbs | .................... | A01G 13/04 47/31 |
| 1,517,846 A * | 12/1924 | Lewis | ................. | E04H 12/2292 52/302.5 |
| D162,243 S * | 2/1951 | Simmons | .......................... | D8/1 |
| 2,611,499 A * | 9/1952 | Mayer | ...................... | B65D 1/10 215/6 |
| 2,962,187 A * | 11/1960 | Morris | ................... | A01K 97/08 220/780 |
| 3,245,175 A * | 4/1966 | Klingberg | ................ | A01G 5/00 47/41.13 |
| 3,554,473 A * | 1/1971 | Rakov | ..................... | E01F 9/692 248/519 |
| 3,748,781 A * | 7/1973 | Erling | ...................... | A01G 9/02 47/84 |

(Continued)

*Primary Examiner* — Peter M Poon
*Assistant Examiner* — Shada Mohamed Alghailani
(74) *Attorney, Agent, or Firm* — Jacob M. Ward; Ward Law Office LLC

(57) ABSTRACT

A weed enclosure device has a main body with a first enclosure half hingedly connected to a second enclosure half. Each of the first enclosure half and the second enclosure half may be movable about a hinge between a closed position and an opened position. The main body may have a top end and a bottom end. A first aperture may be formed in the top end of the main body. A second aperture may be formed in the bottom end of the main body. At least one divider may be disposed in the main body. The divider may have a plurality of flexible holders.

8 Claims, 8 Drawing Sheets

(56) References Cited

U.S. PATENT DOCUMENTS

| | | | | |
|---|---|---|---|---|
| 3,940,884 A * | 3/1976 | Mason, Jr. | A01G 13/0281 | 47/32 |
| 4,138,055 A * | 2/1979 | Harrison | B42D 17/00 | 232/1 C |
| 4,216,622 A * | 8/1980 | Hollenbach | A01G 9/029 | 47/71 |
| 4,386,480 A * | 6/1983 | Horowitz | A01G 9/122 | 248/27.8 |
| 4,603,784 A * | 8/1986 | Chang | A61J 9/00 | 215/11.1 |
| 5,048,229 A * | 9/1991 | Campbell | A01G 13/0237 | 47/32.4 |
| 5,341,926 A * | 8/1994 | Leben | G11B 23/023 | 206/307 |
| 5,347,750 A * | 9/1994 | Mills | A01G 13/0243 | 47/30 |
| 5,502,921 A * | 4/1996 | Hyslop | A01G 13/0281 | 47/32 |
| 5,797,542 A * | 8/1998 | O'Connor | B65D 5/12 | 229/109 |
| 5,819,468 A * | 10/1998 | Jollie | A01G 13/10 | 47/32.4 |
| 5,970,653 A * | 10/1999 | Liang | A01G 13/0243 | 47/30 |
| 6,034,328 A * | 3/2000 | Kjerrumgaard | H02G 3/20 | 174/74 R |
| 6,119,392 A * | 9/2000 | Lais | A01G 13/10 | 47/29.2 |
| 6,145,756 A * | 11/2000 | Kohls | B05B 1/28 | 239/288 |
| 6,233,949 B1 * | 5/2001 | Baker | A01M 21/00 | 62/64 |
| D445,358 S * | 7/2001 | Simmons | D11/152 | |
| 6,273,309 B1 * | 8/2001 | Oppelt | A01K 97/06 | 2/94 |
| 6,357,172 B1 * | 3/2002 | Risgaard | A01G 13/0243 | 47/32.4 |
| 6,378,459 B1 * | 4/2002 | Potente | A01K 39/0113 | 119/428 |
| 6,656,514 B1 * | 12/2003 | Tubbs | A47J 47/08 | 220/229 |
| 6,986,433 B2 * | 1/2006 | Colford | B65D 47/00 | 220/200 |
| 7,310,909 B2 * | 12/2007 | Broel | A47G 7/02 | 248/27.8 |
| 7,396,176 B2 * | 7/2008 | Schoemer | A47G 19/303 | 118/26 |
| D580,679 S * | 11/2008 | Broel | D6/405 | |
| 7,581,350 B2 * | 9/2009 | Ram | A01G 13/0281 | 47/1.5 |
| 7,703,237 B2 * | 4/2010 | Cho | A01G 13/0237 | 47/24.1 |
| 8,127,489 B2 * | 3/2012 | Cagata | A01G 9/029 | 47/5.5 |
| 8,141,293 B2 * | 3/2012 | Ronneke | A01G 13/0243 | 47/65.7 |
| 8,365,941 B2 * | 2/2013 | Mayer | B65D 1/06 | 220/259.3 |
| 8,684,208 B2 * | 4/2014 | Hotell | B65D 21/0209 | 220/4.26 |
| 8,745,920 B1 * | 6/2014 | Mills | A01G 13/0243 | 47/29.6 |
| 8,919,598 B2 * | 12/2014 | Kampf | F16L 59/065 | 220/592.27 |
| 8,985,363 B2 * | 3/2015 | Gubitosi | B65D 25/2867 | 215/397 |
| 8,991,097 B2 * | 3/2015 | Giametta | A01G 9/029 | 47/47 |
| 9,650,803 B1 * | 5/2017 | Bartels | E02D 27/42 | |
| D796,279 S * | 9/2017 | Barina | D8/1 | |
| 9,764,878 B2 * | 9/2017 | Semer | B65D 51/28 | |
| 9,957,089 B2 * | 5/2018 | Rogers | B65D 43/06 | |
| 10,750,670 B2 * | 8/2020 | Logan | A01G 9/029 | |
| 10,765,071 B2 * | 9/2020 | Bottari | A01G 13/0243 | |
| 2002/0038526 A1 * | 4/2002 | Garrofe Morreres | A01G 13/0243 | 47/32.4 |
| 2003/0005617 A1 * | 1/2003 | Holverson, Jr. | B65D 43/0212 | 43/41 |
| 2003/0056434 A1 * | 3/2003 | Gleadall | A01G 13/10 | 47/32.4 |
| 2004/0245207 A1 * | 12/2004 | Chomik | B65D 53/02 | 215/343 |
| 2006/0283852 A1 * | 12/2006 | Greiner | B65F 1/06 | 220/4.22 |
| 2007/0212277 A1 * | 9/2007 | Riley | A61L 2/26 | 422/292 |
| 2008/0035646 A1 * | 2/2008 | Smith | B65D 21/083 | 220/526 |
| 2008/0041851 A1 * | 2/2008 | Thrapp | B65F 1/141 | 220/229 |
| 2011/0258923 A1 * | 10/2011 | Lais | A01G 13/0243 | 47/32.6 |
| 2011/0290805 A1 * | 12/2011 | Rances | B65D 25/04 | 220/529 |
| 2012/0233917 A1 * | 9/2012 | Sovey-Strah | A01G 9/02 | 47/66.3 |
| 2013/0042528 A1 * | 2/2013 | Nason | A01G 13/0281 | 47/65.7 |
| 2014/0250783 A1 * | 9/2014 | Keller | A01G 9/0291 | 47/74 |
| 2015/0040469 A1 * | 2/2015 | Liesche | A01G 9/029 | 47/5.5 |
| 2015/0040475 A1 * | 2/2015 | Schleeh | A01G 9/0291 | 47/66.7 |
| 2016/0001938 A1 * | 1/2016 | Lukin | B65D 47/06 | 220/229 |
| 2019/0208715 A1 * | 7/2019 | Carter | A01G 9/28 | |
| 2021/0092909 A1 * | 4/2021 | Doyle | A01G 13/0243 | |

* cited by examiner

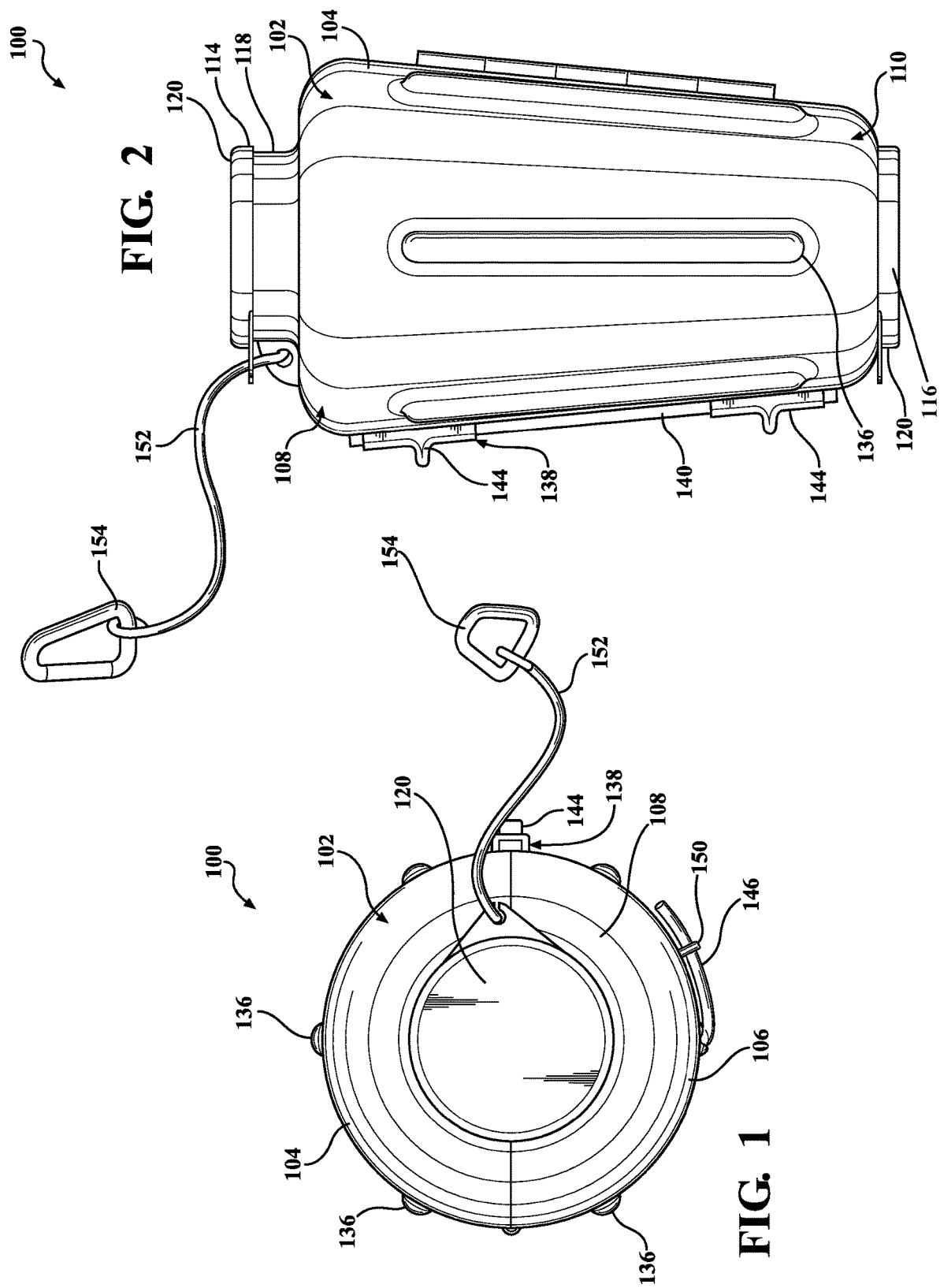

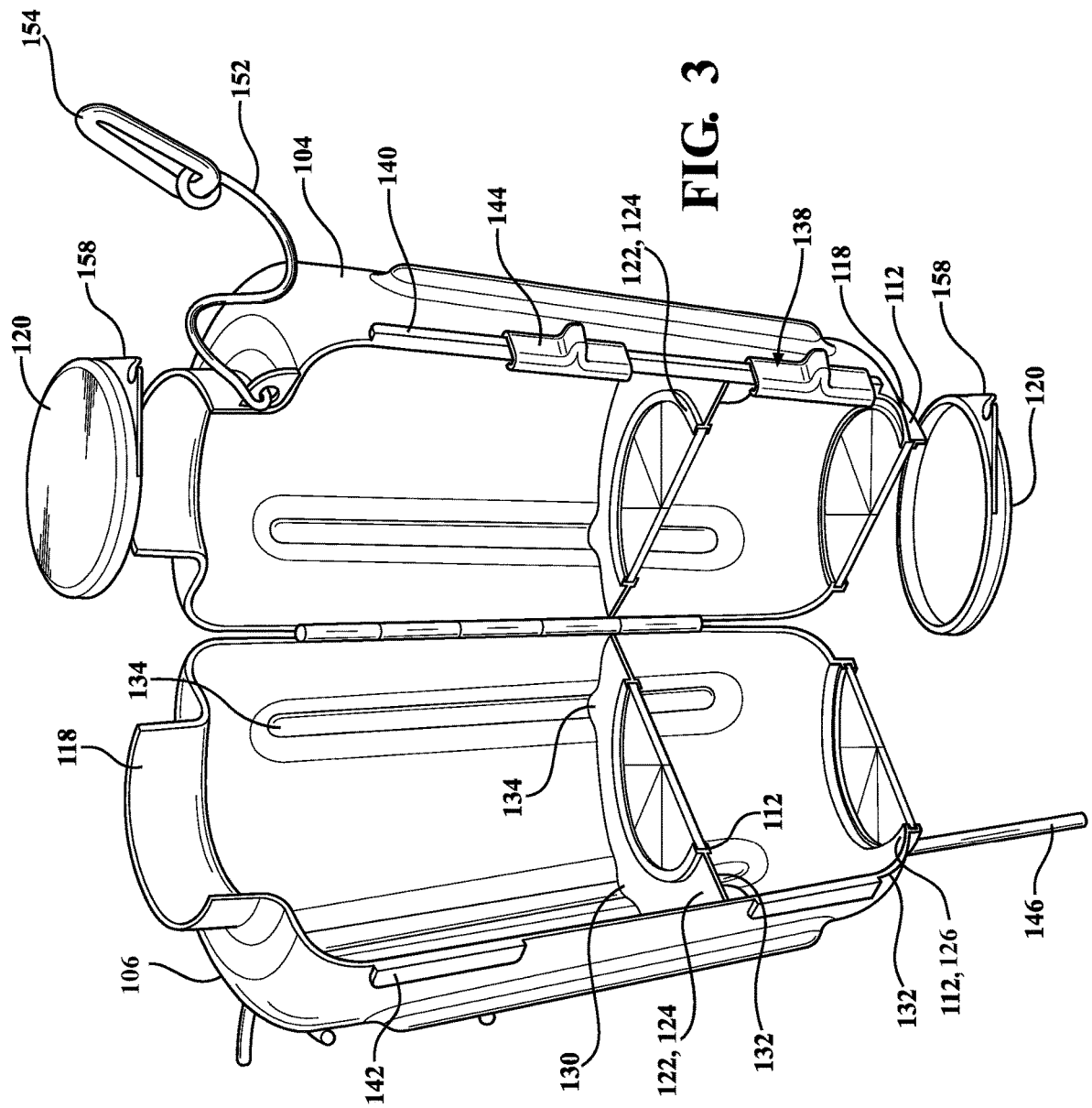

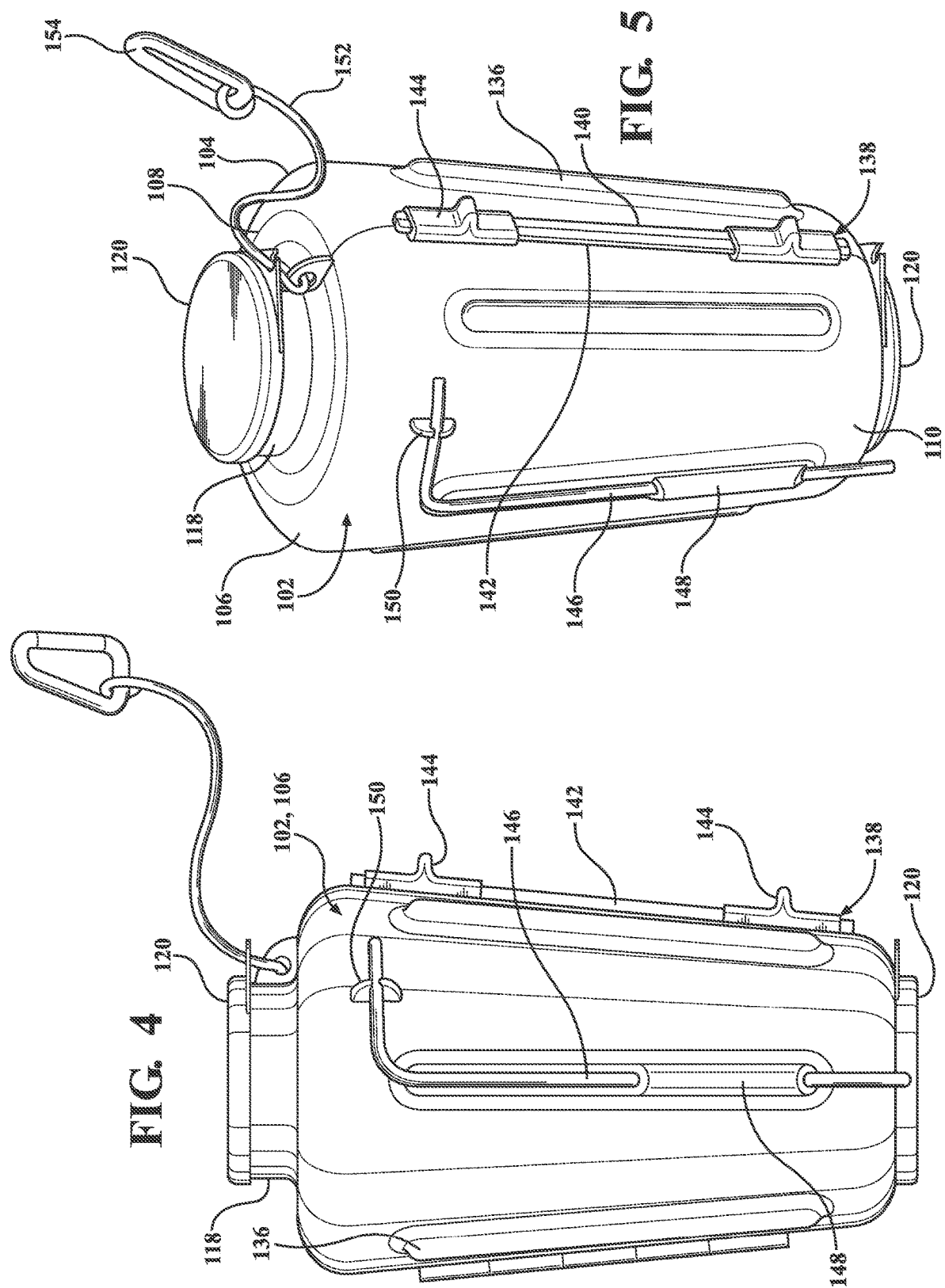

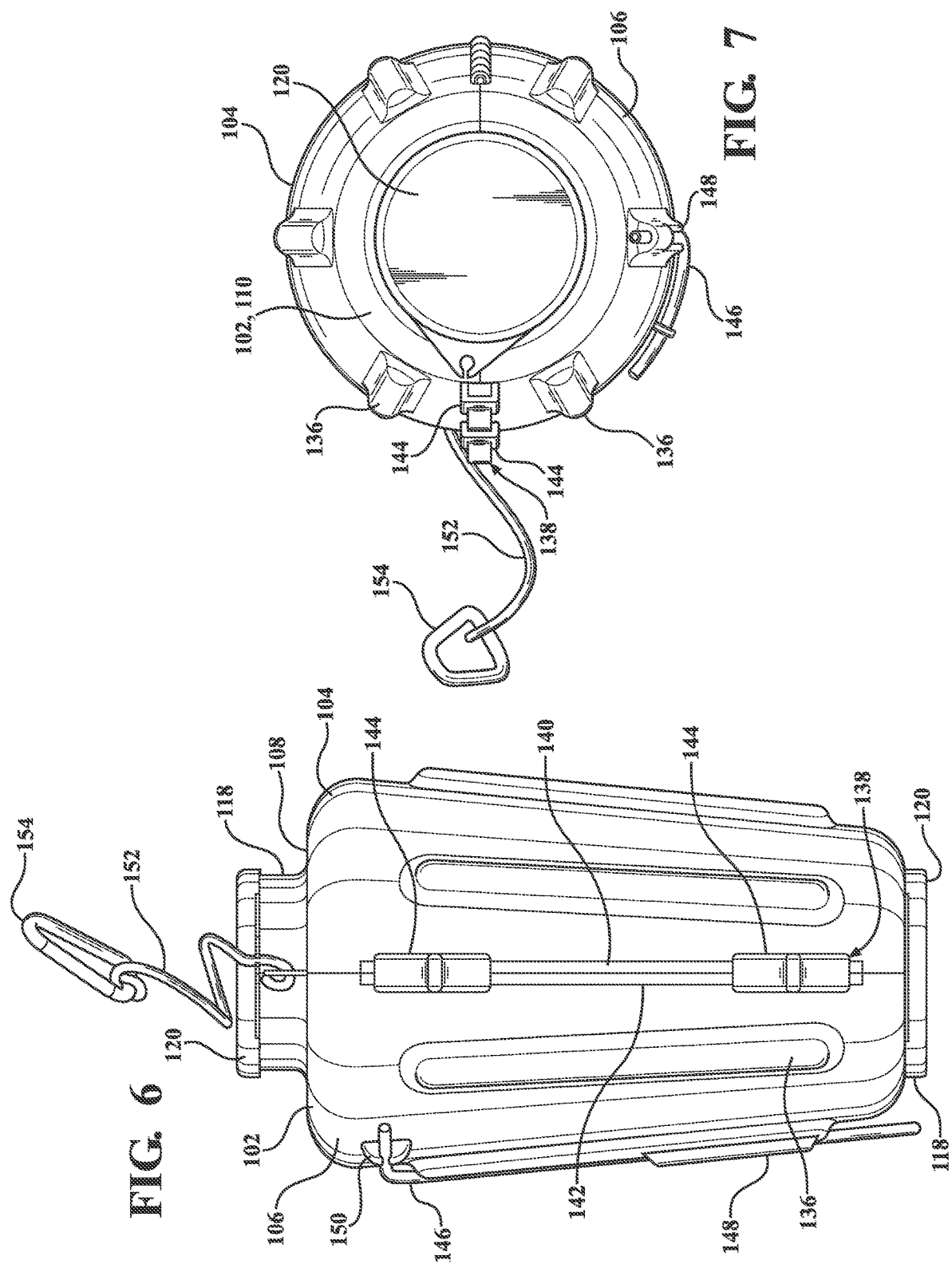

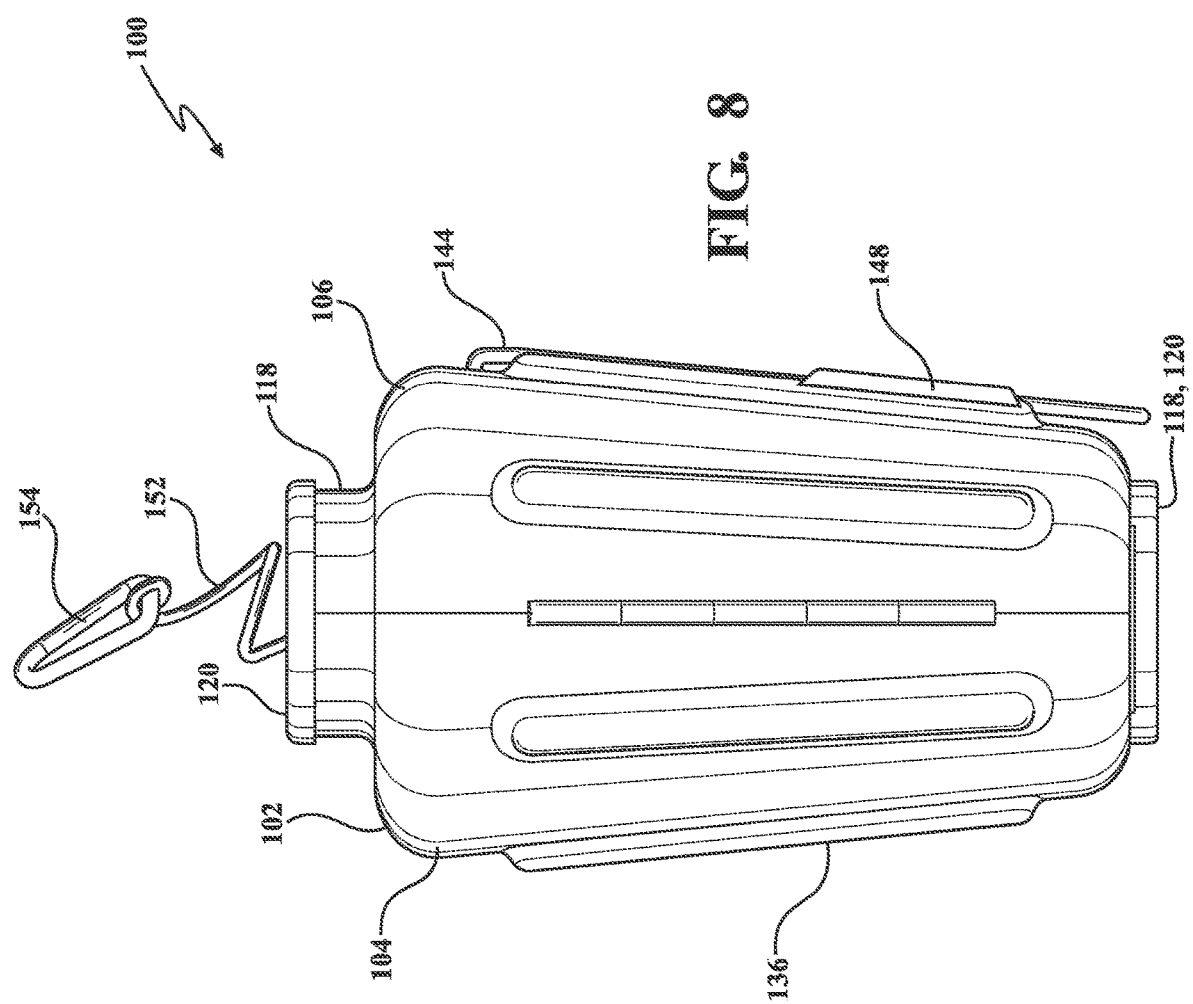

WEED ENCLOSURE DEVICE

CROSS-REFERENCE TO RELATED APPLICATIONS

This application claims the benefit of U.S. Provisional Application No. 62/703,461, filed on Jul. 26, 2018. The entire disclosure of the above application is hereby incorporated herein by reference.

FIELD

The present disclosure relates to weed control and, more particularly, to weed control enclosures.

BACKGROUND

The concept of chemical destruction of obnoxious weeds is well known in the art. Typically, an herbicide is sprayed on the leaves and stem of a weed to kill it. Oftentimes, weeds with deep roots require repeated applications of the herbicide before they die. This can lead to large expenditures for herbicides, as well as excessive herbicide use that could be destructive to neighboring plants.

Another difficulty with traditionally applied herbicides is that rain can wash the herbicide off the leaves and stem of the plant before the herbicide can penetrate into and destroy the plant. Depending upon the type of herbicide, this could have damaging effects upon the surrounding plants.

One of the most common methods of killing weeds is to spray the leaves of the plant with an herbicide. In order to enhance the effectiveness of the herbicide and to prevent destruction of useful plants around the weed, one can place a shroud or some confinement member over the plant.

Another method of killing weeds is to attempt to dig weeds out, root and all, but this method is undesirable because this requires a great deal of manual labor and a user may not remove all of the weed, allowing for regrowth.

There is a continuing need for a device that allows a user to selectively treat a weed with chemicals without affecting nearby vegetation. Desirably, the device requires minimal manual labor.

SUMMARY

In concordance with the instant disclosure, a device that allows a user to selectively treat a weed with chemicals without affecting nearby vegetation, and which requires minimal manual labor, has surprisingly been discovered.

In one embodiment, a weed enclosure device has a main body with a first enclosure half hingedly connected to a second enclosure half. Each of the first enclosure half and the second enclosure half may be movable about a hinge between a closed position and an opened position. The main body may have a top end and a bottom end. A first aperture may be formed in the top end of the main body when in the closed position. A second aperture may be formed in the bottom end of the main body when in the closed position. At least one divider may be disposed in the main body. The divider may have a plurality of flexible holders.

In another embodiment, the at least one divider may be ring shaped and have an outer edge disposed on an interior surface of the main body and a free interior edge. A plurality of flexible holders may be disposed on the free edge. At least one locking mechanism is disposed on the main body and may be configured to selectively secure the first enclosure half and the second enclosure half in the closed position. A stake may be slidably disposed in a sleeve on an exterior surface of the main body.

In a further embodiment, a method of removing a weed includes the steps of identifying the weed and providing a weed enclosure device. Next, a step of enclosing the weed in the weed enclosure device. Followed by, applying weed treatment to the enclosed weed.

In an exemplary embodiment, it would be advantageous to have an apparatus that required minimal manual labor and allowed for the chemical treatment of weeds at a position adjacent to desired vegetation that is not intended for treatment. Furthermore, it would also be advantageous to have an apparatus that did not contaminate surrounding vegetation during treatment.

Still further, it would be advantageous to have an apparatus that wraps around a weed to enable segregated treatment. Therefore, there currently exists a need in the market for an apparatus that grips onto the weed with rubber grooves to enable segregation from surrounding vegetation.

The invention advantageously fills the aforementioned deficiencies by providing a weed enclosure allowing for the destruction of unwanted weeds by providing a container configured to surround the unwanted weed for containing a weed killing chemical spray.

The invention is an aid for killing weeds. The apparatus has a top and bottom lid. The apparatus has a stake to support the container in place. The apparatus fulfills the need for segregating chemical weed killer into one area.

Among other things, it is an advantage of the invention to provide a weed enclosure and destruction device that does not suffer from any of the problems or deficiencies associated with prior solutions.

It is still further an advantage of the invention to offer a carabiner clip to attach the device to various structures including, but not limited to, pants and branches. Still further, the apparatus has locking tabs for the side walls of the container portion.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

A weed enclosure device configured to segregate weeds for destruction. The device comprises a container portion adapted in a movable assembly with a pair of halves configured to surround a weed for the application of a chemical to destroy the weed without contaminating surrounding vegetation. The container portion includes a top lid and a bottom lid configured in a snap-fit assembly, a carabiner clip, a cord, a stake, and a sliding and locking tab assembly for closing and securing the container portion. The container portion includes a pair of dividers generally comprised of a rubber or rubberized material with slits to generally grab the weed.

The container portion includes a sleeve on an external side to receive the stake within the sleeve and including a locking tab for generally securing the stake in a condition that is not engaged with a ground surface.

To use the device, a user will generally open the top and bottom lids along with unlock the canister halves by sliding the locking tab assembly to generally wrap the device around the weed to be treated. When the lids are not in use, the lids snap onto the cord. For treatment, the user will generally place the weed within the dividers and close the container halves to entrap the weed within the container.

Once the container is in place the user will spray the entrapped weed through the top opening to generally protect the surrounding vegetation while treating the weed for destruction. The container may be supported by the stake in the ground. When not in use, the stake can be placed into a locking position along the container.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims.

DRAWINGS

The above, as well as other advantages of the present disclosure, will become readily apparent to those skilled in the art from the following detailed description, particularly when considered in the light of the drawings described hereafter.

FIG. 1 is top plan view of a weed enclosure device according to one embodiment of the present disclosure;

FIG. 2 is a right side elevational view of the weed enclosure device of FIG. 1;

FIG. 3 is front perspective view of the weed enclosure device of FIG. 1 shown in an opened position;

FIG. 4 is a left side elevational view of the weed enclosure device of FIG. 1;

FIG. 5 is top perspective view of the weed enclosure device of FIG. 1 shown in a closed position, and further depicting a locking mechanism in a locked position;

FIG. 6 is front elevational of view the weed enclosure device of FIG. 1 shown in a closed position, and further depicting a locking mechanism in a locked position;

FIG. 7 is bottom plan view of the weed enclosure device of FIG. 1;

FIG. 8 is rear elevational view of the weed enclosure device of FIG. 1;

DETAILED DESCRIPTION

Figure 9:
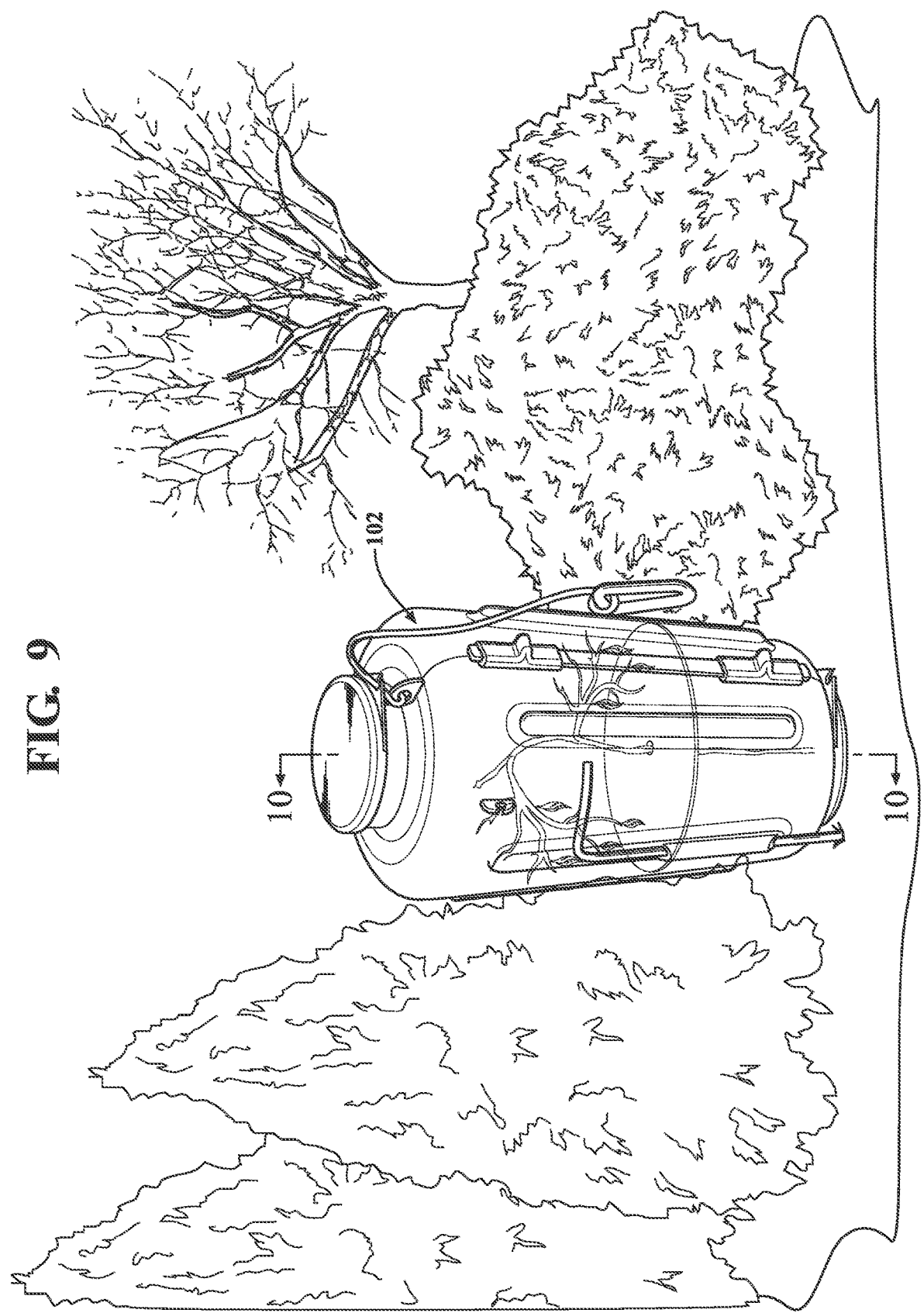
FIG. 9 is top perspective view of the weed enclosure device of FIG. 1, and further depicting a weed enclosed in the device for purpose of treatment and removal.

The following description is merely exemplary in nature and is not intended to limit the present disclosure, application, or uses. In respect of the methods disclosed, the order of the steps presented is exemplary in nature, and thus, is not necessary or critical unless otherwise disclosed.

As shown in FIGS. 1-10, a weed enclosure device 100 may have a main body 102. The main body 102 may be configured to contain a weed. Thus, the main body 102 may have a shape and dimensions that allow the user to fully contain a weed within the main body 102. The main body 102 may be substantially cylindrical in shape, for example. However, it should be understood that a skilled artisan may select any suitable shape for the main body 102, as contemplated by the present disclosure.

The main body 102 is configured to be used outdoors. Therefore, the main body 102 may be fabricated from a material that is durable and waterproof to withstand normal weather conditions. Further, it is desirable for a user to be able to see through the main body 102, in operation. Accordingly, the main body 102 may be fabricated from a transparent or translucent material. The main body 102 may be fabricated from a thermoplastic material such as polycarbonate, acrylic, and resin, as non-limiting examples. A skilled artisan may select any suitable material for the main body 102, as desired.

In particular embodiments, the main body 102 may have a first enclosure half 104 connected to a second enclosure half 106. Each of the first enclosure half 104 and the second enclosure half 106 may be movable about a hinge between a closed position and an opened position. The main body 102 may further have a top end 108 and a bottom end 110.

As further shown in FIGS. 1-10, the main body 102 may have a first aperture 114 formed in the top end 108 when in the closed position. The first aperture 114 may be configured to receive chemicals, in operation. When the weed is enclosed in the weed enclosure device 100, a user may apply chemicals for weed treatment through the first aperture 114 to the weed.

Advantageously, the weed enclosure device 100 contains the chemicals after application. The weed enclosure device 100 militates against the undesirable spread of the weed treatment chemicals. The weed enclosure device 100, therefore, allows the user to selectively treat weeds, as desired.

A second aperture 116 may be formed in the bottom end 110 of the main body 102 when in the closed position. The second aperture 116 may be configured to receive the weed. Desirably, the second aperture 116 allows the weed to be contained within the weed enclosure device 100 while allowing access to the roots of the weed.

Each of the first aperture 114 and the second aperture 116 may be circumscribed by a lip 118. Each of the lips 118 is formed on an exterior surface of the main body 102. Each of the lips 118 may project outwardly from the main body 102. Each of the lips 118 may be configured to receive one of a pair of lids 120 where the main body 102 is in the closed position.

The lids 120 may be configured to selectively seal each of the first aperture 114 and the second aperture 116. Each one of the lids 120 may be configured to connect to each of the lips 118 via a snap fit connection means, as a non-limiting example. Other means for connecting the lids 120 to the main body 102, including threaded connections, may also be employed, as desired.

Advantageously, the lids 120 may militate against the undesirable spread of weed treatment chemicals when the weed enclosure device 100 is not in use. The user may seal the main body 102 for transport elsewhere thus militating against the undesirable spread of the weed treating chemicals. It should be appreciated that a skilled artisan may select any suitable means for sealing the first aperture 114 and the second aperture 116, as desired.

As depicted in FIG. 3, the main body 102 may advantageously have at least one divider 122 disposed therein. More specifically, the main body 102 may have a plurality of dividers 122 disposed therein, which are spaced apparat along a height or length of the main body 102. Most specifically, the main body 102 may have a pair of the dividers 122 including a first divider 124 and a second divider 126 disposed therein.

Each of the dividers 122 may have a plurality of flexible holders 128. It should be appreciated that the dividers 122 and the flexible holders 128 are configured to receive the weed, in operation. The dividers 122 and the flexible holders 128 militate against undesirable movement of the weed, in use, and maintain the weed in a substantially central location within the main body 102. It should be appreciated that the maintenance of the weed in the substantially central location may facilitate an even distribution and coating of the weed with the chemicals for weed treatment, as described further herein.

Each of the first divider 124 and the second divider 126 may be substantially ring shaped with an outer edge 130 and a free edge 132. The plurality of flexible holders 128 may be disposed on the free edge 132.

The first divider 124 may be disposed substantially centrally in the main body 102. The first divider 124 may be integrally formed on an interior surface of the main body 102. In other embodiments, the first divider 124 may be formed separately and disposed on the interior surface of the main body 102.

Figure 10:
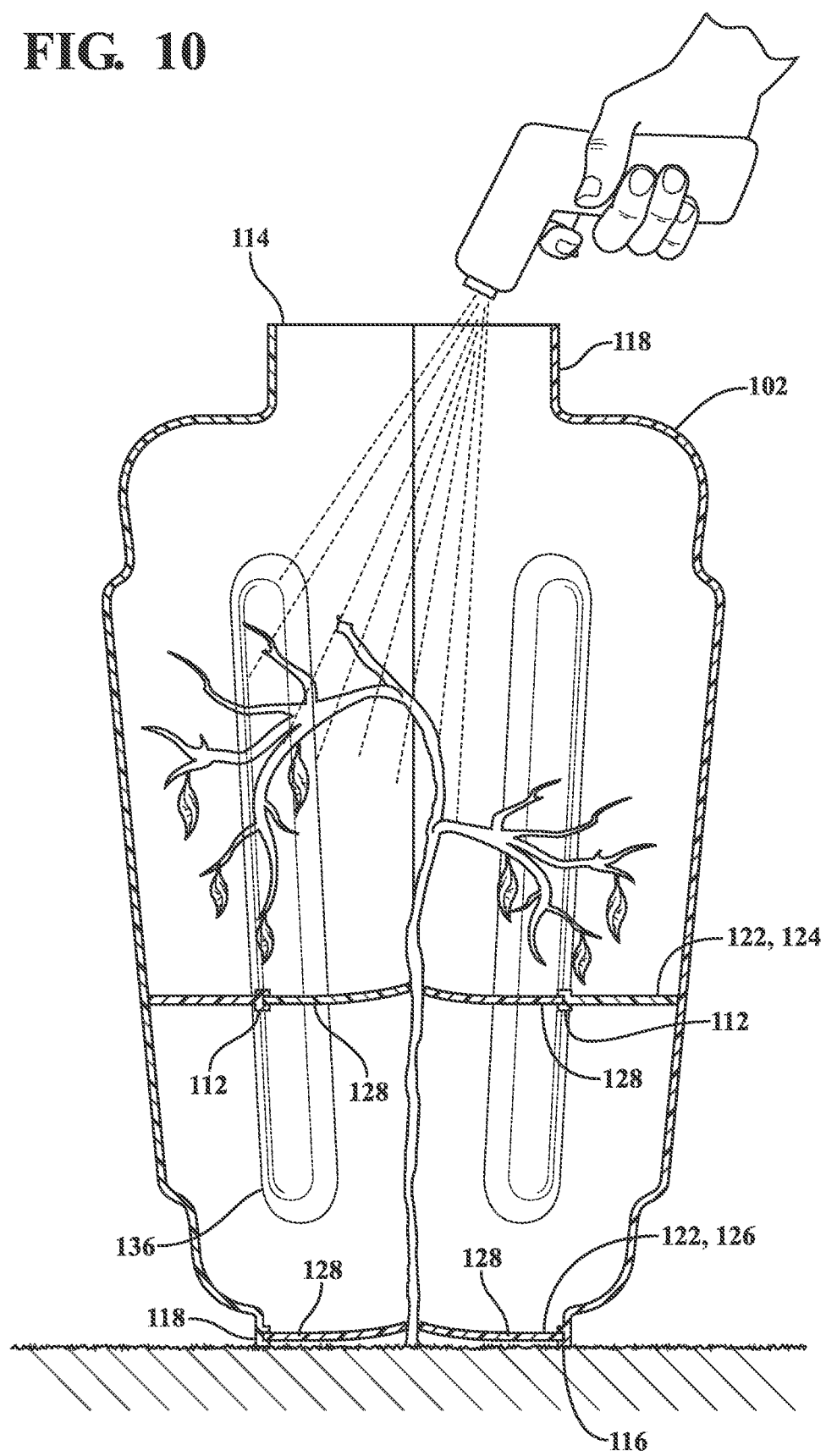
FIG. 10 is cross-sectional, side elevational view of the weed enclosure device taken at section line 10-10 in FIG. 9, and further depicting the weed enclosure device in use with weed treatment chemicals being applied to the enclosed weed.

As further shown in FIG. 3, the first divider 124 may have a plurality of ridges 134 formed on the outer edge 130. The main body 102 may have a plurality of channels 136 formed on the interior surface of the main body 102. Each one of the plurality of channels 136 may receive one of the plurality of ridges 134 of the first divider 124. The channels 136 may also facilitate a gripping of the main body 102 by the user during transport and operation. Advantageously, the cooperation of the ridges 134 and channels 136 militate against the first divider 124 moving undesirably in use. As depicted in FIG. 10, the second divider 126 may be disposed in the second aperture 116.

It should be appreciated that the main body 102 may be bisected into two halves such that each of the first enclosure half 104 and the second enclosure half 106 may be manually movable about the hinge between the closed position and the opened position. Advantageously, this configuration allows a user to easily gather vegetation by closing the weed enclosure device 100 around the identified weed.

The dividers 122 may also be bisected such that one half of each divider 122 remains affixed to one of the first enclosure half 104 and the second enclosure half 106 when the main body 102 is in both the closed position and the opened position. When the main body 102 is in the closed position, each of the bisected halves of the dividers 122 are disposed adjacent to each other to form the full divider 122. When the main body 102 is in the opened position, each of the bisected halves of the divider 122 are spaced apart from each other. Advantageously, the user may trap the weed between the bisected halves of the dividers 122 in an efficient manner.

The flexible holders 128 may be fabricated from a material that is flexible to confirm with and hold the weed by friction force, while also being durable. The flexible holders 128 may be fabricated from a rubber or a rubberized material. Advantageously, the flexible holders 128 may grip the weed such that the weed may be removed from the ground when the weed enclosure device 100 is removed from the ground after chemical weed treatment is applied without the user having to touch the treated weed. A skilled artisan may select any suitable material for the flexible holders 128, as desired.

As shown in FIG. 10, a channel 112 may be formed on a free interior edge 132 of each of the dividers 122. The channel 112 may be substantially annular when the main body 102 is in a closed position. Each of the plurality of flexible holders 128 may be disposed within the channel 112. A skilled artisan may select any suitable means for securing the flexible holders to the dividers 122, as desired.

With reference to FIG. 3, each of the flexible holders 128 may be substantially triangular in shape. The flexible holders 128 may be formed from a single piece of rubber, which has been segmented into the plurality of flexible holders 128. Alternatively, each of the flexible holders 128 may be formed separately and disposed in the channel 112. Other suitable shapes and means for forming the flexible holders 128 may also be selected by a skilled artisan within the scope of the disclosure.

The weed enclosure device 100 may have a locking mechanism 138. The locking mechanism 138 may selectively secure the first enclosure half 104 and the second enclosure half 106 in the closed position. Desirably, the locking mechanism 138 militates against the main body 102 undesirably opening, in operation.

The locking mechanism 138 may include a first rail 140 and a second rail 142. At least one lock tab 144 may be slidably disposed on the at least one of the first rail 140 and the second rail 142. More specifically, the weed enclosure device 100 may include a plurality of locking mechanisms 138. Most specifically, the weed enclosure device 100 may include a pair of the locking mechanisms 138.

As shown in FIGS. 3 and 5, the first rail 140 may be disposed on the exterior surface of the main body 102 adjacent a free edge of the first enclosure half 104. The second rail 142 may be disposed on the exterior surface of the main body 102 adjacent a free edge of the second enclosure half 106. When the main body 102 is in the closed position, the first rail 140 may be disposed adjacent to the second rail 142.

The locking tab 144 may selectively and slidably move between a locked and an unlocked position on the first rail 140. When the main body 102 is in the opened position, the locking tab 144 may be disposed on only the first rail 140. When the main body 102 is in the closed position, the locking tab 144 may be placed in the locked position where the locking tab 144 is disposed on both the first rail 140 and the second rail 142 simultaneously.

It should be appreciated that, when the locking tab 144 is in the locked position, the locking tab 144 may hold the first rail 140 and the second rail 142 together such that the main body 102 selectively remains in the closed position. However, one skilled in the art may select other suitable means for securing the main body 102, in operation.

With continued reference to FIGS. 3 and 4, the weed enclosure device 100 may further include a stake 146. The stake 146 is configured to support the weed enclosure device 100, in operation. The stake 146 may be configured to be disposed in the ground while the weed enclosure device 100 is in use. Advantageously, the stake 146 may militate against the weed enclosure 100 device tipping undesirably when in use. A skilled artisan may select other suitable means for supporting the weed enclosure device 100, as desired.

The stake 146 may be disposed in a sleeve 148 that is formed in the exterior surface of the main body 102. The stake 146 may be configured to slidably move within the sleeve 148. The sleeve 148 may provide additional support to the stake 146 when the stake 146 is in use.

Advantageously, the sleeve 148 may hold the stake 146 to the main body 102 such that the user does not need a separate stake 146. Further, the stake 146 may remain in the sleeve 148 both during use and periods of non-use, further militating against the user losing the stake 146.

As shown in FIGS. 1 and 4-5, a hook 150 may be formed in the exterior surface of the main body 102. The hook 150 may be configured to further secure the stake 146 to the main body 102 while the stake 146 is not inserted into the ground. Desirably, the hook 150 may militate against the stake 146 undesirably becoming lost when not in use.

The weed enclosure device 100 may further include a cord 152 configured to further secure the weed enclosure device 100, in use. An end of the cord 152 may be disposed on the lip 118 of the first aperture 114. An other end of the cord 152 may have a clip 154. The clip 154 may be configured to attach to a nearby plant or branch while the weed enclosure device 100 is in use.

Advantageously, the clip 154 may provide further support for the weed enclosure device 100, such that the clip 154 may militate against the weed enclosure device 100 undesirably tipping while in use.

Each of the lids 120 may be configured to be disposed on the cord 152 when not in use. As shown in FIG. 3, the lids 120 may have a connection portion 158 configured to connect to the cord 152, for example. The connection portion 158 may connect to the cord 152 via a snap fit connection means, as a non-limiting example. Advantageously, the connection portion 158 and the cord 152 militate against the user undesirably losing one of the lids 120 when the weed enclosure device 100 is not in use. A skilled artisan may select any suitable means for holding the lids 120 when not in use, as desired.

Figure 11:
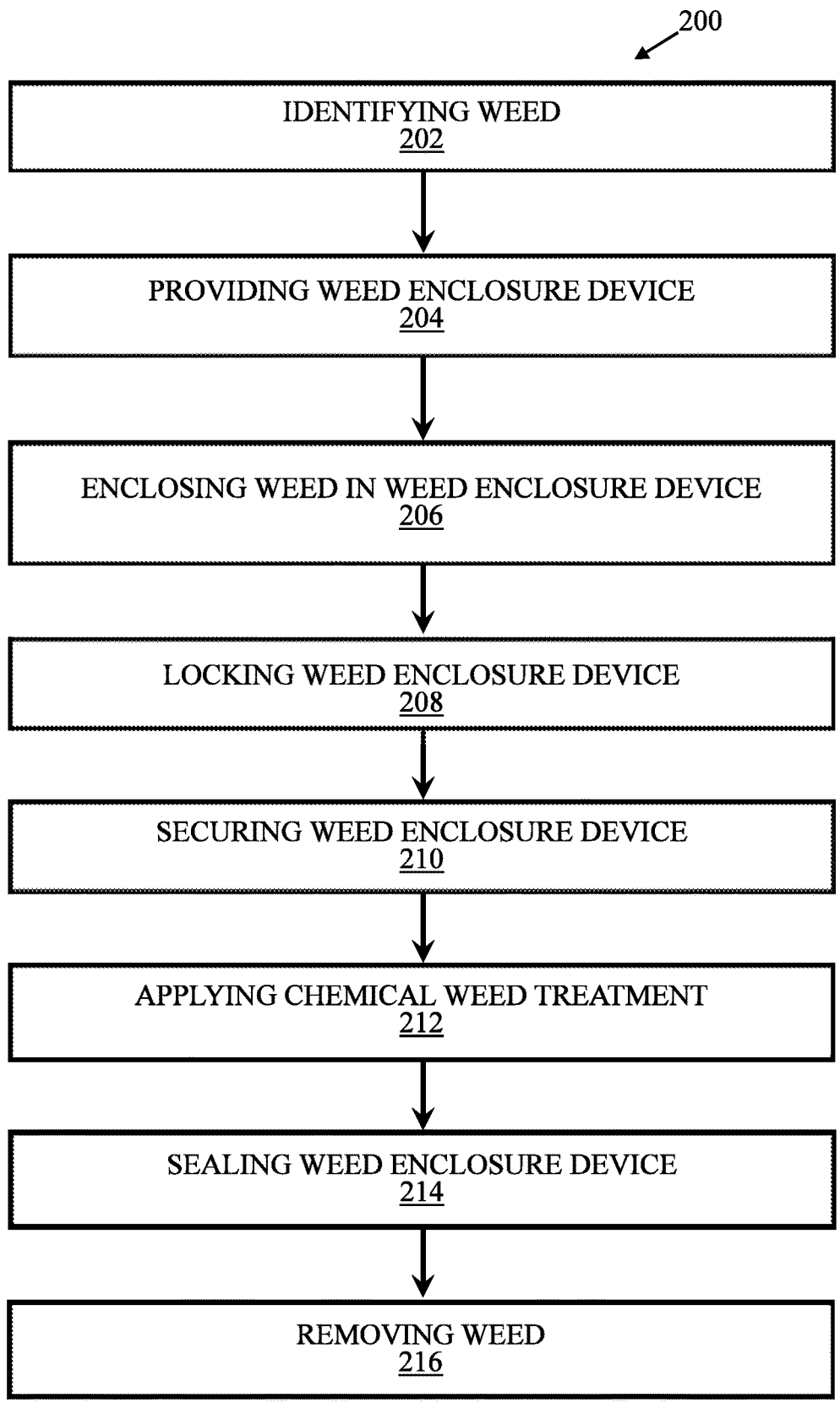
FIG. 11 is a flow chart illustrating a method of using the weed enclosure device according to one embodiment of the present disclosure.

Referring now to FIG. 11, the present disclosure further includes a method 200 for using the weed enclosure device 100. In a first step 202 of the method 200, the weed to be removed is identified. The user may determine a specific weed in an area, for which chemical treatment will be applied in order to remove the specific weed. A second step 204 of the method 200 may be providing the weed enclosure device 100.

A third step 206 of the method 200 may be enclosing the weed in the weed enclosure device 100. The user may open the main body 102 of the weed enclosure device 100. The user may position the weed between flexible holders 128 of each of the dividers 122. The user may then close the weed enclosure device 100 such that the weed is fully contained in the main body 102.

The method 200 may have a fourth step 208 of locking the weed enclosure device 100. The user may move the locking mechanism 138 from the unlocked to the locked position to militate against the weed enclosure device 100 undesirably opening.

The method 200 may have a fifth step 210 of securing the weed enclosure device 100 to the ground. The user may remove the stake 146 from the hook 150. The user may then dispose the stake 146 in the ground by sliding the stake 146 in the sleeve 148 to militate against the device tipping, in use. The user may also attach the clip 154 of the cord 152 to a nearby branch or plant further securing the weed enclosure device 100.

A sixth step 212 of the method 200 may be applying the chemical weed treatment to the weed. Any suitable weed treatment including herbicides or the like may be employed. The user may dispose the chemical weed treatment through the first aperture 114 of the main body 102 and onto the enclosed weed.

A seventh step 214 of the method 200 may be sealing the first aperture 114. The user may dispose one of the lids 120 on the lip 118 of the first aperture 114. The lid 120 may militate against wind and rain interfering with the chemical treatment of the weed.

The eight step 216 of the method 200 may be removing the weed. The user may remove the entire weed enclosure device 100 from the ground such that the flexible holders 128 pull the treated weed from the ground. Alternatively, the user may remove the device 100 without removing the dead weed. The user may then dispose the other one of the lids 120 onto the lip 118 of the second aperture 116 to militate against the weed treatment chemicals undesirably spreading to other plants.

Advantageously, the weed enclosure device 100 of the present disclosure allows the user to selectively apply weed treatment and remove weeds, as desired. The device 100 permits for the treatment of a single weed without affecting the surrounding plants. The weed enclosure device 100 is configured to require little manual labor. Further, the weed enclosure device 100 is configured to be easy to use and store.

While certain representative embodiments and details have been shown for purposes of illustrating the invention, it will be apparent to those skilled in the art that various changes may be made without departing from the scope of the disclosure, which is further described in the following appended claims.

What is claimed is:

1. A weed enclosure device, consisting of:
a main body having a top end and a bottom end and configured to receive a weed, the main body defined by a first enclosure half hingedly connected to a second enclosure half, each of the first enclosure half and the second enclosure half movable about a hinge between a closed position and an opened position, a first aperture formed in the top end of the main body when in the closed position, a second aperture formed in the bottom end of the main body when in the closed position, each of the first aperture and the second aperture circumscribed by a lip that extends outwardly from the main body;
a lid configured to be disposed on the lip the first aperture; and
a first divider and a second divider, the first divider disposed in the main body and spaced apart from the second divider a long a length of the main body, each of the first divider and the second divider having a plurality of flexible holders, the plurality of flexible holders converging at an intersection point in the closed position, with the intersection point of the first divider being coaxial with the intersection point of the second divider, and together the flexible holders of the first divider and the second divider are configured to secure the weed substantially centrally within the main body, each of the first divider and the second divider being bisected into two divider portions, each of the first enclosure half and the second enclosure half receiving one of the divider portions from each of the first divider and the second divider, the divider portions abutting when the main body is in the closed position and spaced part when the main body is in the opened position, each of the divider portions of the first divider and the second divider having an outer edge and a free interior edge, the outer edge disposed on an interior surface of the main body, the free interior edge defined by an annular channel, each of the plurality of holders disposed in the annular channel;

wherein the first divider has a plurality of ridges formed on the outer edge and the main body has a plurality of channels formed on the interior surface of the main body, each one of the plurality of ridges of the divider disposed in one of the plurality of channels wherein the second divider is fixedly attached to the main body and covers the second aperture.

2. The weed enclosure device of claim 1, wherein the flexible holders are fabricated from rubber.

3. The weed enclosure device of claim 1, further comprising at least one locking mechanism disposed on the main body and configured to selectively secure the first enclosure half and the second enclosure half in the closed position.

4. The weed enclosure device of claim 1, wherein the main body has a sleeve, the sleeve disposed on an exterior surface of the main body.

5. The weed enclosure device of claim 1, wherein the main body is fabricated from a thermoplastic material.

6. A method of removing a weed, comprising:
identifying the weed to be removed;
providing a weed enclosure device consisting of a main body having a top end and a bottom end and configured to receive a weed, the main body defined by a first enclosure half hingedly connected to a second enclosure half, each of the first enclosure half and the second enclosure half movable about a hinge between a closed position and an opened position, a first aperture formed in the top end of the main body when in the closed position, a second aperture formed in the bottom end of the main body when in the closed position, each of the first aperture and the second aperture circumscribed by a lip that extends outwardly from the main body; a lid configured to be disposed on the lip the first aperture; and a first divider and a second divider, the first divider disposed in the main body and spaced apart from the second divider a long a length of the main body, each of the first divider and the second divider having a plurality of flexible holders, the plurality of flexible holders converging at an intersection point in the closed position, with the intersection point of the first divider being coaxial with the intersection point of the second divider, and together the flexible holders of the first divider and the second divider are configured to secure the weed substantially centrally within the main body, each of the first divider and the second divider being bisected into two divider portions, each of the first enclosure half and the second enclosure half receiving one of the divider portions from each of the first divider and the second divider, the divider portions abutting when the main body is in the closed position and spaced part when the main body is in the opened position, each of the divider portions of the first divider and the second divider having an outer edge and a free interior edge, the outer edge disposed on an interior surface of the main body, the free interior edge defined by an annular channel, each of the plurality of holders disposed in the annular channel; wherein the first divider has a plurality of ridges formed on the outer edge and the main body has a plurality of channels formed on the interior surface of the main body, each one of the plurality of ridges of the divider disposed in one of the plurality of channels, wherein the second divider is fixedly attached to the main body and covers the second aperture;
enclosing the weed in the weed enclosure device; and
applying weed treatment to the enclosed weed through the first aperture of the weed enclosure device.

7. The method of claim 6, wherein the method includes locking the weed enclosure device after enclosing the weed in the weed enclosure device and before applying a weed treatment to the enclosed weed.

8. The method of claim 7, wherein the method includes securing the weed enclosure device to a ground surface after locking the weed enclosure device.

\* \* \* \* \*